United States Patent
Luo et al.

(10) Patent No.: US 10,822,462 B2
(45) Date of Patent: Nov. 3, 2020

(54) PAPER PRODUCT AND METHOD FOR INCREASING THE STRENGTH THEREOF

(71) Applicant: Kemira Oyj, Helsinki (FI)

(72) Inventors: Yuping Luo, Johns Creek, GA (US); Roopa Tellakula, Suwanee, GA (US); Scott Rosencrance, Carrollton, GA (US)

(73) Assignee: Kemira Oyj, Helsinki (FI)

( * ) Notice: Subject to any disclaimer, the term of this patent is extended or adjusted under 35 U.S.C. 154(b) by 31 days.

(21) Appl. No.: 16/323,264

(22) PCT Filed: Sep. 15, 2016

(86) PCT No.: PCT/US2016/051823
§ 371 (c)(1),
(2) Date: Feb. 5, 2019

(87) PCT Pub. No.: WO2018/052420
PCT Pub. Date: Mar. 22, 2018

(65) Prior Publication Data
US 2019/0177492 A1    Jun. 13, 2019

(51) Int. Cl.
| | | |
|---|---|---|
| C08J 3/05 | (2006.01) | |
| C08J 3/205 | (2006.01) | |
| D21H 17/37 | (2006.01) | |
| D21H 17/39 | (2006.01) | |
| D21H 21/20 | (2006.01) | |
| D21H 21/18 | (2006.01) | |
| D21H 17/38 | (2006.01) | |

(52) U.S. Cl.
CPC ........... *C08J 3/05* (2013.01); *C08J 3/205* (2013.01); *D21H 17/37* (2013.01); *D21H 17/375* (2013.01); *D21H 17/38* (2013.01); *D21H 17/39* (2013.01); *D21H 21/18* (2013.01); *D21H 21/20* (2013.01); *C08J 2333/26* (2013.01)

(58) Field of Classification Search
None
See application file for complete search history.

(56) References Cited

U.S. PATENT DOCUMENTS

| | | | | |
|---|---|---|---|---|
| 3,556,932 A | * | 1/1971 | Coscia et al. | C08B 31/125 162/166 |
| 6,143,820 A | * | 11/2000 | Klier | C08F 8/50 524/556 |
| 7,259,217 B2 | * | 8/2007 | Klaerner | C08F 2/38 524/555 |
| 8,435,382 B2 | | 5/2013 | Lu et al. | |
| 8,894,817 B1 | | 11/2014 | Cheng et al. | |
| 2010/0326615 A1 | | 12/2010 | Lu | |
| 2014/0060763 A1 | | 3/2014 | Bode et al. | |
| 2016/0222590 A1 | | 8/2016 | Zhu et al. | |

FOREIGN PATENT DOCUMENTS

| | | |
|---|---|---|
| GB | 1555340 A | 11/1979 |
| WO | 2006102059 A2 | 9/2006 |
| WO | 2016170230 A1 | 10/2016 |

* cited by examiner

*Primary Examiner* — Dennis R Cordray
(74) *Attorney, Agent, or Firm* — Berggren LLP

(57) ABSTRACT

The present disclosure relates to a novel aqueous composition of a structurally modified, water soluble polymer suitable for papermaking and to a method for manufacturing it. The method includes cleaving a backbone of the acrylamide polymer by a degradation agent and cross-linking the acrylamide polymer subjected to cleaving by using a polyfunctional cross-linking agent.

18 Claims, 5 Drawing Sheets

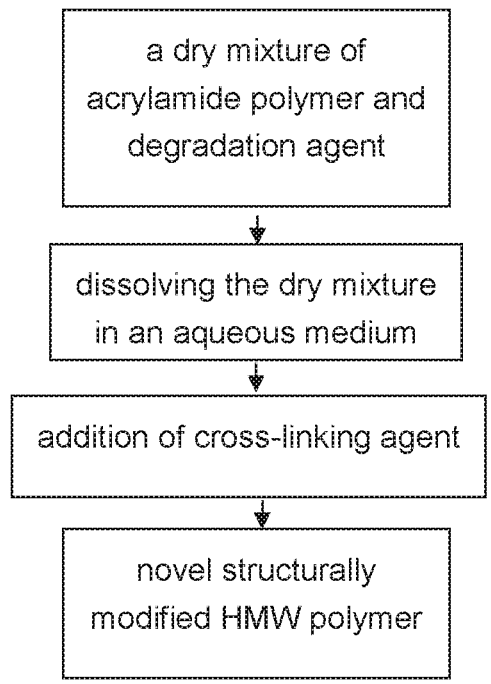
Fig. 2a
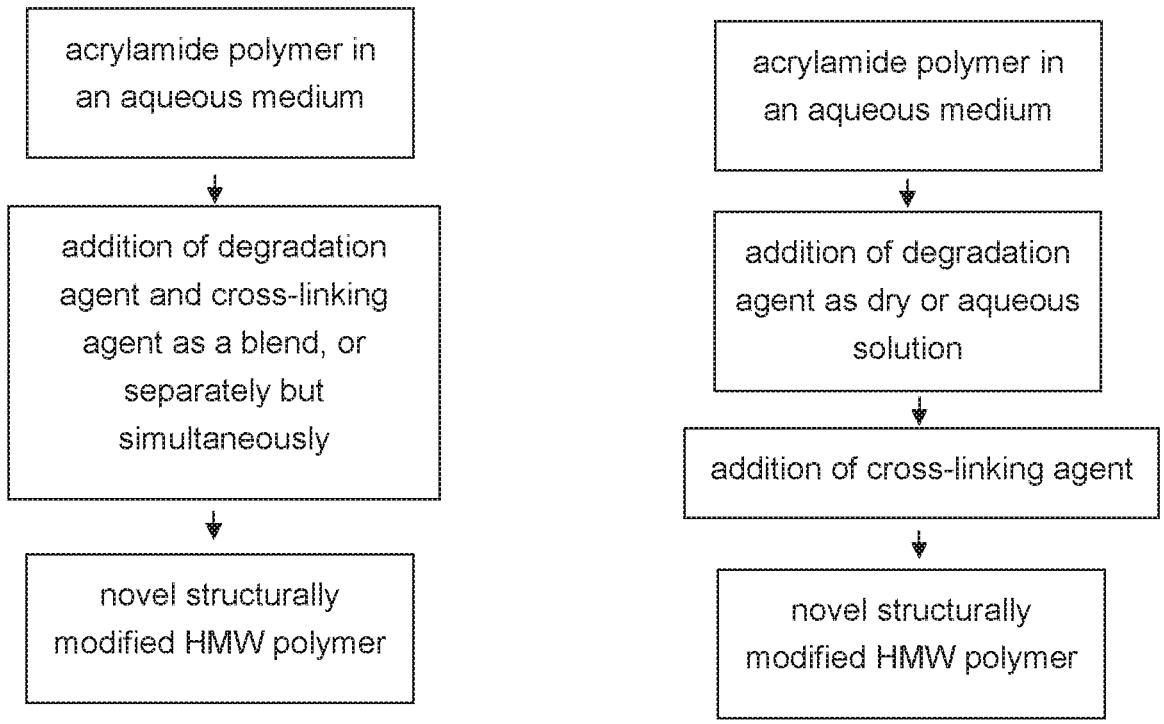
Fig. 2b
Fig. 2c

PAPER PRODUCT AND METHOD FOR INCREASING THE STRENGTH THEREOF

PRIORITY

This application is a U.S national application of the international application number PCT/US2016/051823 filed on Sep. 15, 2016.

FIELD OF THE INVENTION

The present invention relates to a novel aqueous composition of a structurally modified water-soluble polymer suitable for papermaking, and to a method for manufacturing it. More specifically, a structurally modified water-soluble acrylamide polymer, such as glyoxalated polyacrylamide, having an ultra-high molecular weight, is provided suitable for said use.

BACKGROUND OF THE INVENTION

A number of strength aids, including cationic and anionic polyacrylamide and carboxymethyl cellulose, provide dry strength but no wet strength to paper products. Glyoxalated polyacrylamide (GPAM) and polyamidoamine epichlorohydrin (PAE) are known strength aids, which besides dry strength provide wet strength to paper, as well.

Polyamide epichlorohydrin (PAE) resins are commonly used as permanent wet strength agents for manufacturing wet strength paper grades. Typically, the wet strengthened towel grades require high dosage levels of PAE resin to achieve the required wet tensile specifications. The amount of the PAE resin that can be adsorbed onto cellulose fibers is limited by the anionic charge density of the fibers. If not properly managed, unretained wet strength resins will accumulate in the white water system leading to poor machine dewatering, wire and felt filling, sheet breaks and holes, and increased defoamer usage. PAE resin is self-crosslinking and therefore cannot be easily hydrolyzed. Therefore, PAE is suitable for products like kitchen towels, which must retain their integrity even when wetted.

Glyoxal cross-linked polyacrylamide (GPAM) is a widely used synthetic polymer, which upon dehydration forms covalent bonds with cellulose fibers, which are subject to hydrolysis and cause time-dependent dispersal of paper in water. Therefore, GPAM is suitable for use in e.g. toilet paper, in which temporary wet-strength is desirable. Besides tissue paper GPAM is widely used in packaging papers and boards.

Generally, lower molecular weight polymers tend to provide lower paper strengths. Additionally, the cross-linked GPAM cellulose network is more readily degraded via hydrolysis if the molecular weight of the resulting GPAM is lower. Retarding disintegration of the paper product would be desirable in many cases. However, the molecular weight of the typical GPAM commercial product is purposefully kept lower than the maximum achievable molecular weight in order to deliver a homogenous product that is not instantly gelled. The molecular weight of a typical polyacrylamide backbone glyoxylated in the manufacture of conventional GPAMs is therefore moderately low, below 100 000 Dalton, commonly below 10 000 Dalton. Despite of that, the conventional GPAM solutions, at the commonly used concentration levels, suffer an efficiency loss during storage. If not used within a narrow time interval, the GPAM will gel. Once gelling occurs, the GPAM is no longer usable, and the equipment affected must be cleaned. Elevated temperature, such as warmer climates, speeds up the GPAM deterioration and gelling considerably. Thus, the deterioration of the conventional off-site manufactured GPAM may begin already before delivery to the paper mill, and continue during storage so that when eventually used in the order of delivery date, which may be just before the gelling occurs, the achieved strength response is far lower than for freshly prepared conventional GPAM.

Thus, it would be highly desirable to find a novel water-soluble polyacrylamide based papermaking additive, such as wet and/or dry strength agent for paper products, which would have a high and controllable molecular weight while being usable without the above-mentioned problems.

SUMMARY OF THE INVENTION

The object of the present invention is to minimize or even eliminate the disadvantages existing in the prior art.

One object of the present invention is to provide an aqueous, non-gelled composition of a structurally modified, water-soluble polymer having a high molecular weight, usable in papermaking.

Another object of the present invention is to provide a method for manufacturing the aqueous composition of a structurally modified, water-soluble polymer.

Yet another object of the present invention is to provide a dry intermediate product suitable for use in the method for manufacturing the aqueous composition of a structurally modified, water-soluble polymer.

Yet another object of the present invention is to provide a process of making a paper product.

Yet another object of the present invention is to provide a use of the aqueous composition of a structurally modified, water-soluble polymer in a papermaking process.

Yet another object of the present invention is to provide an improved paper product.

These objects are attained with the invention having the characteristics presented below in the characterizing parts of the independent claims.

Some preferable embodiments of the invention are presented in the dependent claims. The features recited in the dependent claims are freely combinable with each other unless otherwise explicitly stated.

Typical method for manufacturing an aqueous composition of a structurally modified, water-soluble polymer according to the invention comprises (i) providing an acrylamide polymer having a standard viscosity of at least about 1 cP, measured at 0.1 weight-% polymer concentration in 1 M NaCl, at 25° C. and pH 8.0-8.5, using Brookfield DVII T viscometer, in an aqueous medium, (ii) incorporating in said aqueous medium a degradation agent capable of reducing the standard viscosity of the acrylamide polymer in an aqueous environment by cleaving a backbone of the acrylamide polymer, and (iii) cross-linking the acrylamide polymer subjected to cleaving by introducing a polyfunctional cross-linking agent to said aqueous medium for obtaining the aqueous composition of the structurally modified water-soluble polymer.

Typical aqueous composition of a structurally modified, water-soluble polymer according to the invention has an intrinsic viscosity at least 0.5 dl/g, preferably at least 0.7 dl/g and more preferably at least 1.0 dl/g, determined by GPC.

According to one preferred embodiment of the invention, an aqueous composition of a structurally modified, water-soluble polymer according to the invention is obtainable by said method according to the invention.

Typical dry intermediate product suitable for use in the method according to the invention comprises a mixture of a dry acrylamide polymer having a standard viscosity of at least about 1 cP, measured at 0.1 weight-% polymer concentration in 1 M of NaCl, at 25° C. and pH 8.0-8.5, using Brookfield DVII T viscometer, and a dry degradation agent capable of reducing the viscosity of the acrylamide polymer in an aqueous environment by cleaving a backbone of the acrylamide polymer.

Typical process of making a paper product according to the invention comprises incorporating an aqueous composition of a structurally modified, water-soluble polymer of the invention in a papermaking furnish.

Typical use of an aqueous composition of a structurally modified, water-soluble polymer according to the invention is in a papermaking process for increasing paper strength, drainage and/or retention.

Typical paper product according to the invention comprises a structurally-modified, water-soluble polymer according to the invention.

Now it has been surprisingly found that by (i) providing a cationic, anionic or nonionic acrylamide polymer having a standard viscosity of at least about 1 cP, measured at 0.1 weight-% polymer concentration in 1 M NaCl, at 25° C. and pH 8.0-8.5, using Brookfield DVII T viscometer, in an aqueous medium; (ii) incorporating in said aqueous medium a degradation agent capable of reducing the standard viscosity of the acrylamide polymer in an aqueous environment by cleaving a backbone of the acrylamide polymer; and (iii) cross-linking the acrylamide polymer subjected to cleaving by introducing a polyfunctional cross-linking agent to said aqueous medium, it is possible to obtain an aqueous composition of a structurally modified, water-soluble polymer which provides several advantages especially when used in papermaking. The aqueous composition of the structurally modified, water-soluble high molecular weight polymer, obtained by the present invention, is effective in improving paper strength properties, especially wet strength and dry strength, drainage and/or retention. The aqueous composition of the structurally modified, water-soluble polymer has the additional benefit that high molecular weight acrylamide polymer may be used in the papermaking without causing gelling of the aqueous composition. This provides remarkable economical benefits as a loss of unintentionally gelled polymer compositions and subsequent cleaning of affected equipment are avoided, and a loss of strength performance of the polymer composition during storage is avoided. Additionally the properties of the structurally modified, water-soluble polymers may be easily adjusted for example by varying the dosage of the degradation agent and the cross-linking agent.

The experiments performed by the inventors show that the present disclosure provides an aqueous composition of structurally modified, water-soluble polymer, more specifically of glyoxal cross-linked, ferrous sulfate cleaved cationic acrylamide copolymer which offers improved extended strength performance. Especially wet strength performance which may be typically defined by 30 and 60 minutes soak wet tensile tests, is enhanced compared to commercially available conventional GPAM products in all the paper grades tested and compared to the commonly applied PAE wet strength resin in heavy weight paper grades.

In the method and aqueous composition of the structurally modified water-soluble polymer of the present disclosure the molecular weight of the structurally modified polymer may be controlled, and a preferred high molecular weight obtained, thus providing desired effects in papermaking such as increased paper strength. Additionally, as the result of the combined function of a degradation agent and a cross-linking agent on the acrylamide polymer backbone, a non-gelled aqueous composition of a structurally modified polymer may be obtained having much higher final molecular weight and a different network structure compared to cross-linked polymers not involving combined use of degrading agent, such as conventional GPAMs.

When this novel ultra-high molecular weight structurally modified water-soluble polymer of the present invention, especially glyoxal cross-linked, degraded acrylamide polymer, is applied for the purposes of obtaining strength response in papermaking systems containing cellulose or cellulose derivatives, it is unexpectedly and surprisingly observed that the resulting cellulose structure has a much higher wet strength performance relative to that obtained using conventional GPAMs. In the method of the present disclosure a wet strength of about 35% higher than that obtained by the conventional GPAM systems has been achieved.

The benefits and advantages gained by the method and the aqueous composition of the structurally modified water-soluble polymer of the present disclosure include, for example, achieving the desired ultra-high molecular weight polymer suitable for use in papermaking for example for strength enhancement, providing a non-gelled aqueous composition of high molecular weight structurally modified acrylamide polymer, and improved wet and dry strength performance to the final paper product. Moreover, the present disclosure allows on-site cross-linking such as glyoxalation of acrylamide polymer subjected to degradation by cleaving the backbone just prior to supplying the aqueous polymer composition to the furnish or the fibrous web. The composition of the present disclosure may be implemented at a running paper machine and also as a batch process by use of simple equipment. The present disclosure provides a non-PAE wet strength source and the use of dry polymer backbones allowing for improved logistics and reduced costs. The method and composition of the present disclosure may further be applied in difficult climate conditions.

BRIEF DESCRIPTION OF THE FIGURES

FIGS. 2a, 2b and 2c are schematic process charts of exemplary embodiments of the present disclosure.

DETAILED DESCRIPTION OF THE INVENTION

Figure 1:
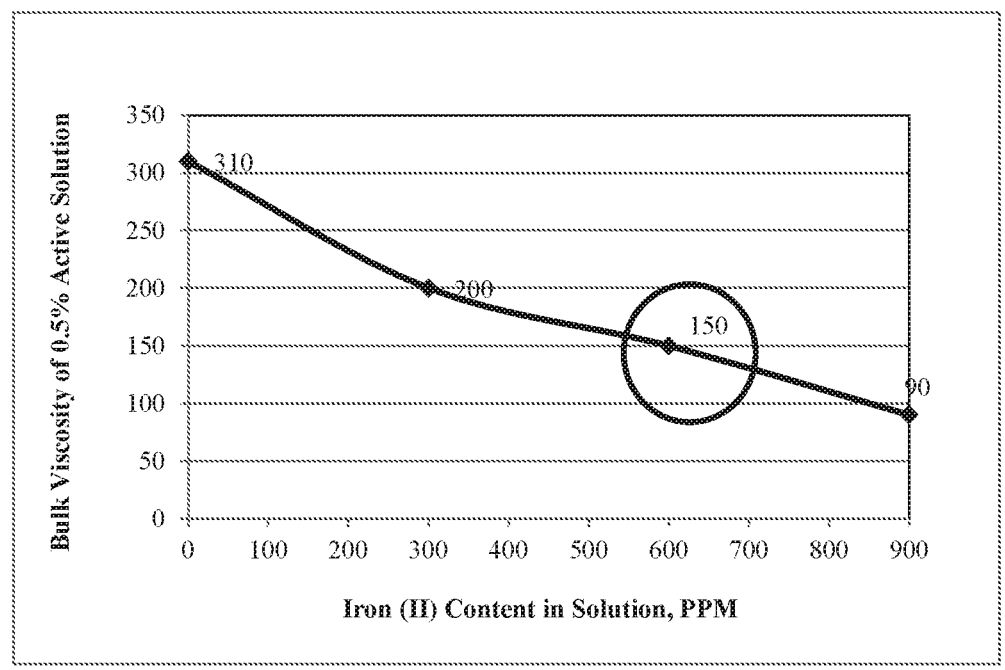
FIG. 1 is a graph showing the effect of iron(II)sulfate on the viscosity of 0.5% solution of the cationic polyacrylamide backbone.

By wet or dry strength is meant a measure of how well fiber web holds together upon a force of rupture in wet or in dry form. Wet strength is routinely expressed as the ratio of wet to dry tensile force at break. Dry strength or dry tensile strength is the maximum stress that a paper web can withstand while being stretched or pulled before failing or breaking. Typically, determination of 30 or 60 min soak wet tensile strength is applied. The procedural standards are explained in TAPPI T 456. It describes the procedure for the determination of the tensile strength of paper and paperboard after saturation with water. This procedure is applicable to papers and paperboard, excluding corrugated board, that will be subjected to stress while wet, either during processing or use. Such materials include but are not limited to tissue products, papers used in map-making, photography, and blue prints, bags and food wraps.

By the term "viscosity" is meant the internal friction or molecular attraction of a given material which manifests itself in resistance to flow. It is measured in liquids by standard test procedures and is usually expressed in poise or centipoise (cP) at a specified temperature. The viscosity of a fluid is an indication of a number of behaviour patterns of the liquid at a given temperature including pumping characteristics, rate of flow, wetting properties, and a tendency or capacity to suspend an insoluble particulate material.

As used herein, the terms "polymer", "polymers", "polymeric" and similar terms are used in their ordinary sense as understood by one skilled in the art, and thus may be used herein to refer to or describe a large molecule (or group of such molecules) that contains recurring monomers. Polymers may be formed in various ways, including by polymerizing monomers and/or by chemically modifying one or more recurring monomers of a precursor polymer. A polymer may be a "homopolymer" comprising substantially identical recurring monomers formed by, e.g., polymerizing a particular monomer. A polymer may also be a "copolymer" comprising two or more different recurring monomers formed by, e.g., copolymerizing two or more different monomers, and/or by chemically modifying one or more recurring monomers of a precursor polymer. Anionic polymers are polymers possessing a negative net charge, cationic polymers are polymers possessing a positive net charge, and nonionic polymers are polymers possessing a net charge of 0.

A backbone of the acrylamide polymer refers in this disclosure to the main chain of the acrylamide polymer which is a result of the (co)polymerisation reaction of acrylamide, and optionally any cationic, anionic or non-ionic monomers copolymerisable with acrylamide. The main chain is substantially linear chain to which all other chains may be regarded as pendant.

As used herein, the term "water-soluble" is understood so that the polymer is miscible with water. When mixed with an excess of water, the polymer is preferably fully dissolved and the obtained polymer solution is preferably essentially free from discrete polymer particles or granules. Excess of water means that the obtained polymer solution is not a saturated solution.

As used herein, the term "degradation agent" refers to any compound or mixture of compounds which is capable of reducing the standard viscosity of an acrylamide polymer when in an aqueous environment by cleaving the backbone of the acrylamide polymer, i.e. the main chain of the acrylamide polymer, into fragments. The effect of the degradation agent and the cleavage of the polymer backbone can be seen in the decreasing viscosity of the aqueous medium comprising the acrylamide polymer.

As used herein, the term "cross-linking agent" refers to any compound or mixture of compounds containing at least two reactive groups, thereby providing a means of covalently linking two target groups present in the acrylamide polymer and/or in the fragments thereof, which fragments are resulted from the cleaving of the acrylamide backbone. The cross-linking agent may covalently link cleaved fragments of the acrylamide polymer to other said fragments and/or to the backbone of the acrylamide polymer.

The molecular weight of a polymer is the key factor for controlling the hydrolysis of the polymer-cellulose network. Use of high molecular weight polymer would cease polymer-cellulose linkages from hydrolysing in water and promote the wet strength performance. The high molecular weight for polymers as paper chemical is a desirable feature in other aspects as well: higher molecular weight means a better adsorption on the cellulose fibre, especially for paper machine wet end additives, lower penetration through fibrous web surface, especially for paper surface sizing agents, and better performances.

In one aspect, the present invention provides a method for manufacturing a structurally modified, water-soluble polymer for use in papermaking. This method comprises the following steps:

(i) providing an acrylamide polymer having a standard viscosity of at least about 1 cP, measured at 0.1 weight-% polymer concentration in 1 M NaCl, at 25° C. and pH 8.0-8.5, using Brookfield DVII T viscometer, in an aqueous medium, (ii) incorporating in said aqueous medium a degradation agent capable of reducing the standard viscosity of the acrylamide polymer in the aqueous environment by cleaving the backbone of the acrylamide polymer into the smaller polymeric fragments, and (iii) cross-linking the acrylamide polymer subjected to cleaving by introducing a polyfunctional cross-linking agent to said aqueous medium for obtaining the aqueous composition of structurally modified water-soluble polymer.

Additionally, the present invention provides a structurally modified, water-soluble polymer obtained by the method.

In this way a high molecular weight polymer may be obtained in the form of an aqueous, non-gelled composition, the polymer expressing excellent strength response in papermaking. While the wet strength of the paper product is increased, the polymer according to the present disclosure maintains or improves the dry strength of the product in comparison e.g. with prior art use of commercially available GPAM.

In one embodiment of the invention, the acrylamide polymer has a standard viscosity of at least 1.2 cP, preferably at least 1.5 cP, and more preferably at least 2.0 cP, measured at 0.1 weight-% polymer concentration in 1 M NaCl, at 25° C., pH 8.0-8.5, using Brookfield DVII T viscometer.

In the manufacture of for example conventional GPAMs, the molecular weight of the acrylamide polymer needs to be kept moderate, i.e. the standard viscosity of the acrylamide polymer needs to be e.g. about 0.3 cP, otherwise the glyoxylation will lead into gelling of the reaction mixture. In the manufacture of the aqueous composition of the structurally modified water-soluble polymer according to the present invention the average molecular weight of the acrylamide polymer may be exceptionally high since the acrylamide polymer backbone is subjected to degradation. Even dry CPAMs may be used that conventionally have an average molecular weight of several million Dalton. The use of dry acrylamide polymers is attractive especially in view of logistics.

Higher standard viscosity of the acrylamide polymer corresponds to higher molecular weight. High molecular weight polymers are available in higher solids content, even as dry powders. As the acrylamide polymer backbone being subjected to degradation agent has higher molecular weight, also the structurally modified water-soluble polymer obtained after cross-linking may have higher molecular weight. Typically, the acrylamide polymer has a molecular weight of at least 2 million Dalton, preferably at least 5 million Dalton or even more preferably at least 10 million Dalton. According to an embodiment of the invention the acrylamide polymer has a molecular weight in the range of 10 to 20 million Dalton, or in the range of 10 to 15 million Dalton.

Preferably, the acrylamide polymer is a dry polymer. The degradation agent and the cross-linking agent may be premixed together before addition, or they may be added separately such as sequentially, the degradation agent being added before the cross-linking agent such as glyoxal. The additions of the degradation agent and the cross-linking agent, such as glyoxal, may also overlap, in which case the addition of the degradation agent may continue when the cross-linking agent addition is started. In this way the degradation agent starts breaking of the acrylamide polymer backbone earlier than the cross-linking starts, but breaking of the backbone into fragments still continues at same time with cross-linking reaction.

In one embodiment the acrylamide polymer and the degradation agent are introduced into the aqueous composition first, and the cross-linking agent, such as glyoxal, is introduced thereto subsequently.

Advantageously, the degradation agent starts breaking of the acrylamide polymer backbone before the cross-linking starts. The degradation agent continues breaking of the acrylamide polymer backbone in parallel with cross-linking e.g. by the glyoxylation, until all of the degrading power of the degradation agent has been consumed or quenched. Cross-linking reaction, on the other hand, may be an equilibrium reaction, as is the case for e.g. glyoxylation. Thus, the bulk viscosity of the aqueous composition of the cross-linking and degrading acrylamide polymer evolves until the degrading power of the degradation agent has been consumed or quenched and the cross-linking, such as glyoxylation, reaction has reached an equilibrium.

In one embodiment, the acrylamide polymer and the degradation agent is dissolved in the aqueous medium simultaneously as a dry mixture. The dry mixture may be provided by mixing dry acrylamide polymer and dry degradation agent. This embodiment has the additional utility that the dry mixture has good storage stability, is easily and cost-efficiently transported to the site of use, and the cleaving of the backbone of the acrylamide polymer does not start before the dry mixture is brought into an aqueous environment.

In one embodiment the degradation agent is mixed into a further aqueous medium and then combined with the acrylamide polymer in the aqueous medium.

In one embodiment dry acrylamide polymer is dissolved in an aqueous solution of the degradation agent.

In one embodiment step (iii) of the method is initiated after all degradation agent has been incorporated to the aqueous medium in step (ii) of the method, i.e. cross-linking of the acrylamide polymer subjected to cleaving is initiated to the aqueous medium only after all degradation agent has been incorporated to the aqueous medium.

In one embodiment at least step (iii) of the method, i.e. crosslinking of the acrylamide polymer subjected to cleaving, is conducted on site of the use of the aqueous composition of the structurally modified, water-soluble polymer.

The degradation agent may be any compound or mixture of compounds capable of breaking, i.e. cleaving the backbone of the acrylamide polymer in an aqueous environment into smaller polymeric fragments. This has the effect of reducing the standard viscosity of the acrylamide polymer, and the effect of reducing the bulk viscosity of an aqueous composition comprising the acrylamide polymer. In other words, the degradation agent may be any compound or mixture of compounds capable of reducing the standard viscosity of the acrylamide polymer by cleaving the backbone of the acrylamide polymer into polymeric fragments thereof.

The degradation agent may be selected from compounds or mixtures of compounds capable of reducing the standard viscosity of the acrylamide polymer by at least 5%, advantageously by at least 10%. As a comparison, a mere hydrolysis of functional groups from side chains of e.g. an acrylamide based copolymer does not cause sufficient reduction of viscosity.

In one embodiment the degradation agent is selected from oxidizing degradation agents, reducing degradation agents, or any combinations thereof. Preferably, the degradation agent is a reducing degradation agent.

In one embodiment the oxidizing degradation agent is selected from the group consisting of sodium percarbonate, sodium hypochlorite, sodium persulfate, potassium persulfate, ammonium persulfate, hydrogen peroxide, sodium perborate, or any combinations thereof.

In one embodiment the reducing degradation agent is selected from the group consisting of an iron compound, tin(II) chloride, sodium borohydride ($NaBH_4$), sodium dithionite, or any combinations thereof. Reducing degradation agents may provide faster degradation than oxidizing agents.

The degradation agent may also be an enzymatic degradation agent, such as an oxidase.

In an exemplary embodiment the degradation agent is selected from the group consisting of an iron compound, sodium borohydride ($NaBH_4$), sodium dithionite, sodium percarbonate, sodium persulfate, potassium persulfate, ammonium persulfate, hydrogen peroxide, sodium perborate, to avoid incorporating chlorides.

In a preferred embodiment, the degradation agent comprises an iron compound. This compound is advantageously a ferrous compound such as a ferrous salt or a ferric compound such as a ferric salt, these being available in dry powder form. Iron compounds are generally environmentally friendly compounds.

The term ferrous is used according to its customary meaning to indicate a divalent iron compound (+2 oxidation state or Fe(II)). The term ferric is used according to its customary meaning to indicate a trivalent iron compound (+3 oxidation state or Fe(III)).

In an exemplary embodiment the ferrous salt comprises an organic anion, an inorganic anion, or a mixture thereof. In an advantageous embodiment, the ferrous salt is ferrous citrate, ferrous chloride, ferrous bromide, ferrous fluoride, ferrous sulfate, ammonium iron sulfate or combinations thereof.

In one embodiment, the iron-containing degradation agent comprises ferrous sulfate.

In an exemplary embodiment, the ferric salt comprises an organic anion, an inorganic anion, or a mixture thereof. In exemplary embodiments, the ferric salt is ferric citrate, ferric chloride, ferric bromide, ferric fluoride, ferric sulfate, and combinations thereof.

The most advantageous polymer degradation agent for use in the present disclosure is iron(II)sulfate. Iron sulfate, in particular ferrous sulfate, is able to dissolve and degrade at ambient pulp suspension conditions whereas the other degradation agents require elevated temperature to achieve the same polymer degradation effectiveness.

Together with the ferrous or ferric iron compound another polymer degradation agent may be used, such agent being advantageously selected from the group consisting of persulfates, peroxides, sodium chlorite, tin(II)chloride and percarbonates.

In one embodiment the amount of the degradation agent varies from 0.5 to 15 weight-% of the acrylamide polymer, preferably 1.0 to 12 weight-%, and even more preferably 2.5 to 10 weight-%, calculated as dry. In case the degradation agent contains crystal water, the expression calculated as dry excludes the presence of the crystal water. In this range the degradation of the polymer backbone proceeds adequately, yet controllably, so as to avoid the degradation from proceeding too extensively thereby causing too low molecular weight. The amount of the degradation agent is expressed excluding the potential bound water.

In one embodiment the content of 0.5% by weight of the acrylamide polymer backbone in aqueous medium with addition of 600 ppm iron(II) sulfate resulted in a stable GPAM composition via on-site glyoxalation. The resulting stable GPAM solution offers improved time-extended wet strength (wet tensile after 30 min soak) over conventional commercially available GPAM product, in lightweight paper grades, and delivered equal or better wet strength (wet tensile after 60 min soak) than both the PAE wet strength resin and the conventional GPAM in heavyweight paper grades.

In one embodiment the polyfunctional cross-linking agent is a bifunctional cross-linking agent. In a preferred embodiment the polyfunctional cross-linking agent is a dialdehyde cross-linking agent providing aldehyde functionality to the cross-linked polymer, rendering the polymer cellulose-reactive. More preferably the cross-linking agent is a glyoxal, which is a common commercially available dialdehyde. Glyoxal may provide faster cross-linking reaction compared e.g. to dialdehydes having higher chain length/number of carbon atoms.

The cross-linking reaction such as glyoxalation itself in the present disclosure may be any known or obvious cross-linking such as glyoxalation sequence. An example of a representative disclosure for carrying out glyoxalation is presented in U.S. Pat. No. 8,435,382. Generally, conventional GPAM is prepared by reacting a cationic polyacrylamide backbone, with glyoxal in a slightly alkaline aqueous solution, pH from about 7 to 8, and by stabilizing under acidic conditions pH from about 3 to 6.

In one embodiment the amount of the polyfunctional cross-linking agent is from 5 to 80 weight-%, preferably from 8 to 60 weight-%, more preferably from 8 to 30 weight-% of the acrylamide polymer, calculated as dry. Amounts above 80 weight-% may provide extremely high reaction speed. On the other hand amounts below 5 weight-% may provide unreasonably slow reaction rate. Amounts up to 60 weight-%, especially up to 30 weight-%, may provide reaction speed that is convenient to control. In one embodiment, the cross-linking agent to acrylamide unit molar ratio is at least 0.4. Advantageously, the cross-linking agent to acrylamide unit molar ratio is from 0.4 to 0.7.

In one embodiment the acrylamide polymer is a copolymer originating from at least 50 mol-% of acrylamide monomers. Dialdehyde cross-linking agents such as glyoxal may react with the amide group of the acrylamide. Thus the acrylamide monomer level of at least 50 mol-% provides good cross-linking rate and level of cross-linking thereby increasing the molecular weight of the cross-linked polymer, and thus the strength performance thereof in papermaking.

In one embodiment the acrylamide polymer is a cationic acrylamide (co)polymer. In one embodiment the acrylamide polymer is an anionic acrylamide (co)polymer. In one embodiment the acrylamide polymer is a nonionic (co)polymer. Net cationic charge is preferred as cationic charge binds efficiently to anionic fibres and anionic particles in the papermaking furnish. In certain other papermaking situations anionic net charge may be preferred, for example when interaction with other, cationic chemicals is desired. In certain other papermaking situations nonionicity may be preferred, for example when presence of charges would interfere other interactions taking place, or when the nonionic polymer comprises hydrophobic monomers as the interacting groups.

In one embodiment the acrylamide polymer is a copolymer of acrylamide and cationic monomers, wherein cationic monomers are preferably selected from the group consisting of 2-(dimethylamino)ethyl acrylate (ADAM), [2-(acryloyloxy)ethyl] trimethylammonium chloride (ADAM-Cl), 2-dimethylaminoethyl methacrylate (MADAM), [2-(methacryloyloxy)ethyl]trimethylammonium chloride (MADAM-Cl), [3-(acryloylamino)propyl]trimethylammonium chloride (APTAC), [3-(methacryloylamino)propyl]trimethylammonium chloride (MAPTAC), and diallyldimethylammonium chloride (DADMAC). In a preferred embodiment the cationic monomers are selected from [2-(acryloyloxy)ethyl] trimethylammonium chloride (ADAM-Cl), [2-(methacryloyloxy)ethyl] trimethylammonium chloride (MADAM-Cl), and diallyldimethyl¬ammonium chloride (DADMAC). Quaternary amines are preferred cationic monomers because their charge is not pH dependent. More preferably the cationic monomer is [2-(acryloyloxy)ethyl] trimethylammonium chloride (ADAM-Cl).

In one embodiment the acrylamide polymer is a copolymer originating from at most 30 mol-%, preferably at most 25 mol-%, and more preferably at most 20 mol-% of cationic monomers. Cationic acrylamide copolymers originating from at most 30 mol-% of cationic monomers have the benefit of easier metering compared to use of highly charged, cationic polymers, the use of which involves the challenge of exact metering and risk of overcationization of the paper machine circuit. Additionally lowering the amount of cationic monomers and increasing available acrylamide units may enhance the cross-linking rate such as glyoxylation rate and the equilibrium of cross-linking. The cationicity may have an effect on the strength response of paper. For example, cationic monomers may decrease strength response of paper with furnishes having low zeta-potential. Thus, in one embodiment the amount of cationic monomers is at most 10 mol-% based on the total monomer content. Typically, the backbone polymer comprises 8-25 mol-% of cationic monomers.

The acrylamide polymer may be an acrylamide containing polymer including acrylamide homopolymers, copolymers, and terpolymers including polyacrylamide; polyacrylamide derivatives; partially hydrolyzed polyacrylamide; partially hydrolysed polyacrylamide derivatives; methacrylamide homopolymers, copolymers, and terpolymers; diacetone acrylamide polymers; N-methylolacrylamide polymers; friction-reducing acrylamide polymers; and combinations thereof. In one embodiment the acrylamide polymer is PVAm obtained by partial or complete hydrolysis of groups from the side chains of poly(N-vinylformamide).

In one embodiment the method for manufacturing the aqueous composition of a structurally modified, water-soluble polymer further comprises buffering the aqueous medium before introducing the polyfunctional cross-linking agent thereto. The pH of the aqueous composition is subsequently adjusted by buffering the composition by adding buffer solution thereto. In one embodiment the pH of the aqueous medium is adjusted to a value of at least 7.0, preferably to a value between 7.0 and 7.5, providing optimal pH for the cross-linking reaction of certain cross-linking agents, such as glyoxal. Additionally, the higher the pH, the higher is the degradation rate, especially when using reducing agents such as ferrous sulphate.

Any buffers that simultaneously function as both a weak acid and a weak base, and are able to maintain the desired pH may be used.

In an exemplary embodiment, the buffer is selected from carbonate buffers, phosphate buffers, acetate buffers, citrate buffers, formiate buffers, tris buffers (tris=tris(hydroxymethyl)aminomethane), ftalate buffers, or any mixtures thereof.

The buffer may be prepared from sodium carbonate, sodium bicarbonate, sodium hydroxide, sodium phosphate monobasic, sodium phosphate dibasic, acetic acid, sodium acetate, potassium acetate, or any mixtures thereof.

Since the acrylamide polymer backbone is degraded before and/or during the cross-linking, e.g. glyoxylation, a desired cross-linking level may be achieved without gelling the reaction mixture. In one embodiment the aqueous composition of a structurally modified water-soluble polymer has a bulk viscosity of at most 50 cP, preferably at most 20 cP, more preferably at most 15 cP, measured at 25° C. using Brookfield DVII T viscometer. When the bulk viscosity is at most 50 cP, the composition is easier to dose and overflocculation is easier to avoid.

The solids content of the aqueous composition of a structurally modified water-soluble polymer may be at most 5 weight-%, preferably at most 3 weight-%, and more preferably around 2 weight-%. By using such low solids contents high viscosities may be avoided thereby making the composition easier to handle and e.g. to mix with the furnish.

Typical aqueous composition of a structurally modified, water-soluble polymer according to the invention has an intrinsic viscosity (IV) at least 0.5 dl/g, preferably at least 0.7 dl/g and more preferably at least 1.0 dl/g, determined by GPC; said aqueous composition of a structurally modified, water-soluble polymer has preferably obtained by the method according to the invention. Suitable GPC system and measurement conditions are described more specifically in Example 6.

In a typical embodiment of the invention, a polydispersity index ($M_w/M_n$) of the structurally modified water-soluble polymer according to the invention is <5.0, preferably <4.0 and more preferably <3.5. A typical mass average molar mass (Mw) of a structurally modified, water-soluble polymer according to the invention is at least 0.5 Mg/mol, preferably at least 0.7 Mg/mol and more preferably at least 1.0 Mg/mol. A number average molar mass (Mn) of a structurally modified, water-soluble polymer according to a typical embodiment of the invention is at least $2.8 \times 10^5$ g/mol, preferably at least $3.0 \times 10^5$ g/mol and more preferably at least $3.2 \times 10^5$ g/mol. Mw, Mn and polydispersity index ($M_w/M_n$) are determined by GPC. Suitable GPC system and measurement conditions are described more detailed in Example 6.

According to one preferred embodiment of the invention the structurally modified, water-soluble polyacrylamide polymer is a glyoxylated polyacrylamide. Preferably, the glyoxylated polyacrylamide is obtained by the method according to the invention.

In one embodiment a dry intermediate product suitable for use in the method of the present disclosure is provided, wherein the intermediate product comprises a mixture of a dry cationic, anionic or nonionic acrylamide polymer having a standard viscosity of at least about 1 cP, measured at 0.1 weight-% polymer concentration in 1 M of NaCl, at 25° C., pH 8.0-8.5, using Brookfield DVII T viscometer, and a dry degradation agent capable of reducing the viscosity of the acrylamide polymer in an aqueous environment by cleaving the backbone of the acrylamide polymer. The advantageous materials and properties to be applied to the dry intermediate are those already discussed within the description of the method and composition of the present disclosure.

Because the acrylamide polymer used in the present disclosure may have exceptionally high molecular weight, even dry CPAMs may be used. Thus a dry intermediate product containing dry CPAM and dry degradation agent may be formulated, and transported to the site of use, and cross-linked such as glyoxylated on-site prior to use, saving transportation costs, compared to e.g. conventional GPAMs having solids contents around 10-15 weight-%. Also the generally known drawback of GPAM, namely instability, may be avoided due to the on-site cross-linking such as glyoxylation and use directly or soon after glyoxylation. Thus desired glyoxylation levels may be obtained incorporating even high level of aldehyde functionalities into the polymer, thereby further increasing the cellulose-binding capacity of the obtained structurally modifies water-soluble polymer and performance in paper-making, without the drawback of gelling during storage.

In an exemplary embodiment of the present disclosure, dry CPAM and dry degradation agent, e.g. an iron compound, are mixed together and this mixture is introduced into make-down water at an elevated temperature such as of 35-38° C. The formed aqueous composition is mixed e.g. at an agitation speed of about 350 rpm for about 10 minutes. The pH of the aqueous composition is subsequently adjusted by buffering the composition by adding buffer solution thereto. The mixing is continued for example about 20 minutes, and subsequently, an aqueous glyoxal composition is introduced. The mixing is further continued for about 40 minutes where after the aqueous composition is pumped into a storage tank. Thus formed aqueous composition is stable for at least 24 h.

The dosage of the structurally modified, water-soluble polymer according to the present disclosure is advantageously from 0.4 to 2.3 kg/907 kg (about 1-5 lb/ton) of paper dry matter.

A paper product containing the structurally modified, water-soluble polymer of the present disclosure has increased dry and wet strength, as well as higher filler content in case of a filled paper grade, due to improved retention, compared to paper manufactured using e.g. conventional GPAM.

The structurally modified, water-soluble polymer of the present disclosure increases drainage and wet strength of the web thereby allowing higher running speeds compared to paper manufactured using e.g. conventional GPAM.

Because of the ultra-high molecular weight and/or the novel network structure, the structurally modified, water-soluble polymer of the present disclosure provides remarkably improved performance over e.g. conventional GPAM when used in papermaking, including improved dry and wet tensile strength, improved retention and improved drainage, and improved runnability.

In particular, the paper product according to the present disclosure is tissue paper such as kitchen paper, or packaging paper, paperboard or cardboard. The invention extends the time the paper product as wetted holding its integrity, while letting it disintegrate after having served its purpose and being disposed of.

The present disclosure is further illustrated by the following non-limiting examples.

Experimental Part

An aqueous composition of ultra-high molecular weight glyoxal cross-linked, ferrous sulfate cleaved cationic acrylamide copolymer ("novel GPAM") is provided for use e.g. as a non-PAE wet strength agent. The aim was to develop a product that could provide high dry and wet strength responses and a low wet strength decay rate to replace commercial polyamidoamine epichlorohydrin (PAE) products commonly used as permanent wet strength agents in papermaking.

The degradation agent according to the present disclosure is simple to use and enables on-site batch preparation procedure using simple equipment. Moreover, the composition of the present disclosure is more economical than using e.g. the commercial PAE products or a conventional GPAM product. The same or even better strength performance was obtained with reduced cost.

Dry cationic acrylamide copolymer backbone is used in the examples, allowing improved logistics and both cost and product robustness for difficult climate conditions.

Determination of Polymer Standard Viscosity

The standard viscosity is used to indicate the molecular weights for polymers having molecular weights more than 1 million Dalton. Standard viscosity is determined with a Brookfield DVII T viscometer. The 0.2 weight-% water solution of polymer is diluted to 0.1 weight-% concentration with 11.7 weight-% NaCl solution to make a 50:50 solution of polymer and 11.7 weight-% NaCl in a 250 mL beaker, i.e. 0.1 weight-% polymer concentration in 1 M NaCl. Then, pH of the 0.1 weight-% salt dilute polymer solution is adjusted to pH 8.0-8.5 by dilute NaOH solution or $H_2SO_4$ solution before the viscosity measurement. 19 ml of solution is taken using a graduated cylinder, and slowly poured into the Brookfield SV chamber and the temperature of the SV solution in the chamber is adjusted to 25° C. The viscosity of 0.1 weight-% solution is measured at 25° C., using spindle #00, the spindle speed being 60 RPM. The unit of SV is centipoise (cP).

Determination of Bulk Viscosity

The bulk viscosity is used to indicate the viscosity of an aqueous solution of polymer in the prevailing solids content. Bulk viscosity is determined with a Brookfield DVII T viscometer at 25° C. The unit of bulk viscosity is equally centipoise (cP).

Example 1

A cationic dry polyacrylamide copolymer "HMW CPAM" with 8-13 mol-% cationic monomer content (ADAM-Cl) based on the total monomer content, and having a molecular weight range of 15-20 million Dalton, easily degraded and dissolved into water at ambient water temperature. The dry polymer dissolution time was about 1 hour. The amount of the copolymer in the solution was 0.5 weight-%. Various amounts of iron(II)sulfate ($FeSO_4 \ast 7H_2O$), 0, 300, 600, 900 ppm, were added and bulk viscosity levels of the solutions were determined.

The results are shown in FIG. 1. It is seen that in general the viscosity decreased as the content of iron(II)sulfate in the aqueous solution increased, indicating a decrease of the molecular weight from that of the initial HMW (high molecular weight) CPAM backbone polymer. When the iron(II)sulfate content of the solution was increased to 600 ppm, an optimal polymer molecular weight had been reached for producing a stable aqueous composition of the glyoxal cross-linked, ferrous sulfate cleaved cationic acrylamide copolymer ("novel GPAM") providing maximum wet strength efficacy for the paper to be produced.

A comparison of standard viscosities of aqueous solutions of CPAMs, indicating the molecular weights of the polymers, is presented in Table 1. HMW CPAM is an nondegraded cationic acrylamide copolymer, degraded HMW CPAM is the same but cleaved with iron(II)sulfate i.e. ready for on-site glyoxalation, and LMW (low molecular weight) CPAM is a nondegraded cationic acrylamide copolymer used as a backbone polymer for manufacture of conventional GPAM FB3000.

TABLE 1

| Backbone polymer | Polymer Standard Viscosity, cP | Comments |
| --- | --- | --- |
| HMW CPAM | 3.54 | Dissolved solution bulk viscosity was high and generated an unstable GPAM solution if a degradation agent was not used |
| Degraded HMW CPAM for on-site | 3.09 | the solution of the present disclosure achieved desired polymer molecular weight |

TABLE 1-continued

| Backbone polymer | Polymer Standard Viscosity, cP | Comments |
|---|---|---|
| glyoxalation | | for the on-site batch process glyoxalation |
| LMW CPAM (the backbone for FB 3000) | 0.28 | Conventional low MW backbone polymer for conventional off-site glyoxalation |

The composition according to the present disclosure yielded a polymer standard viscosity, indicative of the polymer molecular weight, much greater than the LMW CPAM used as a backbone polymer for manufacture of conventional GPAM. The molecular weight of the polymer is the key factor to control the hydrolysis of the GPAM-cellulose network. High molecular weight of the backbone polymer reduces hydrolysis of the novel GPAM-cellulose network, and promotes the permanent wet strength development.

Example 2

A batch of 1890 l (500 gallon) of aqueous composition of the high molecular weight, glyoxal cross-linked, ferrous sulfate cleaved cationic acrylamide copolymer ("novel GPAM") according to the invention was manufactured. The process scheme for the preparation is shown in FIG. 2a.

31.7 kg (69.7 lb) of dry intermediate product of dry cationic polyacrylamide (95 weight-%) having standard viscosity of 3.54 cP (corresponding to average MW of ca. 10-15 MDa) having cationic monomer content of 10 mol-% corresponding to charge density of about 1.2 meq/g, and a dry degradation agent ($FeSO_4*7H_2O$, 5 weight-% as is i.e. including the crystal water) was mixed with 1810 kg (3982.8 lb) of hot water (42° C.), until dissolved. 44.9 l (11.87 gallon) of 12% by weight buffer solution ($NaHCO_3$, pH 10) was added at the rate of 11-15 l (3-4 gallons) per minute. After 20 mins, 13 l (3.43 gallon) of 40% glyoxal was added at 7.6 l (2 gallons) per minute, then mixed 40 min, and pumped to the storage tank.

The aqueous composition of the glyoxal cross-linked, ferrous sulfate cleaved cationic acrylamide copolymer ("novel GPAM") was found to be stable at least for 24 h.

Example 3

The aqueous composition of the glyoxal cross-linked, ferrous sulfate cleaved cationic acrylamide copolymer ("novel GPAM") according to the present disclosure was tested as wet and dry strength agent in heavyweight paper in the paperboard weight range, using conventional GPAM (FB 3000) and conventional PAE wet strength resin (FS 4063) at the product dosage level of 1.36 kg/ton (about 3 lb/ton) as comparisons. Handsheets of a basis weight of 50 kg/307 m$^2$ (about 110 lb/3300 ft$^2$) were made and tested by standard handsheet methods. Two handsheet making conditions were evaluated, namely (i) acidic papermaking condition at a headbox pH 5.5, and (ii) alkaline papermaking condition at a headbox pH 7.5 and alkalinity adjusted with 150 ppm of $NaHCO_3$.

Figure 3:
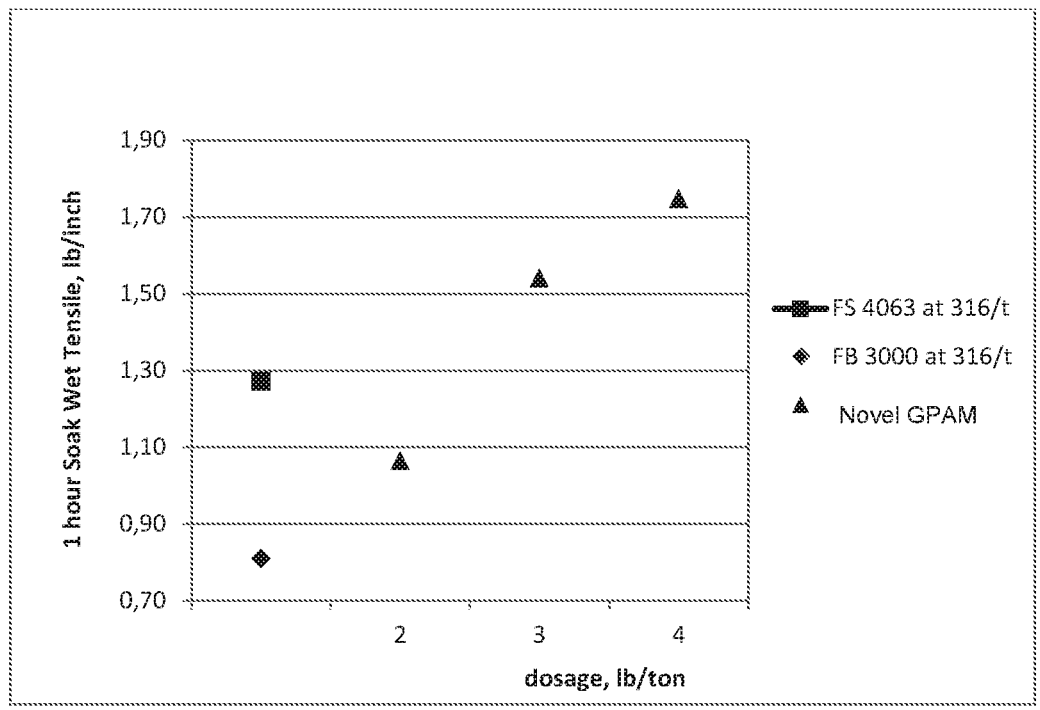
FIG. 3 is a graph showing the measured wet tensile strength, under papermaking pH 5.5, achieved using conventional GPAM (FB3000) and conventional PAE wet strength resin (FS4063) compared to three different dosages of the aqueous composition of glyoxal cross-linked, ferrous sulfate cleaved cationic acrylamide copolymer (Novel GPAM) according to the present disclosure.
Figure 4:
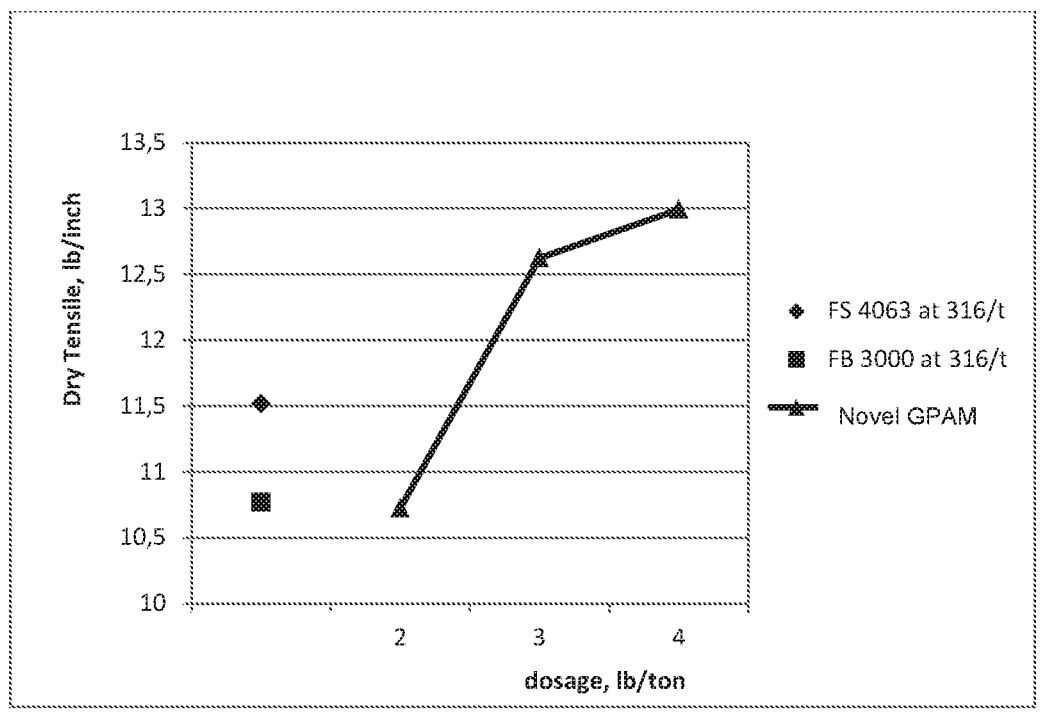
FIG. 4 is a graph showing the measured dry tensile strength, under papermaking pH 5.5, achieved using conventional GPAM (FB3000) and conventional PAE wet strength resin (FS4063) compared to three different dosages of the aqueous composition of glyoxal cross-linked, ferrous sulfate cleaved cationic acrylamide copolymer (Novel GPAM) according to the present disclosure.

For the acidic conditions the resulting wet and dry tensile strengths measured after 1 hour soaking in water are shown in FIGS. 3 and 4, respectively. The results show that the novel GPAM is capable of delivering significantly higher permanent wet and dry strengths than both conventional PAE and GPAM at an equal dosage level (depicted in the beginning of the dosage axis though having a dosage of about 3 lb/ton). Using the novel GPAM according to the present disclosure wet and dry strength values increased with the dosage level.

Figure 5:
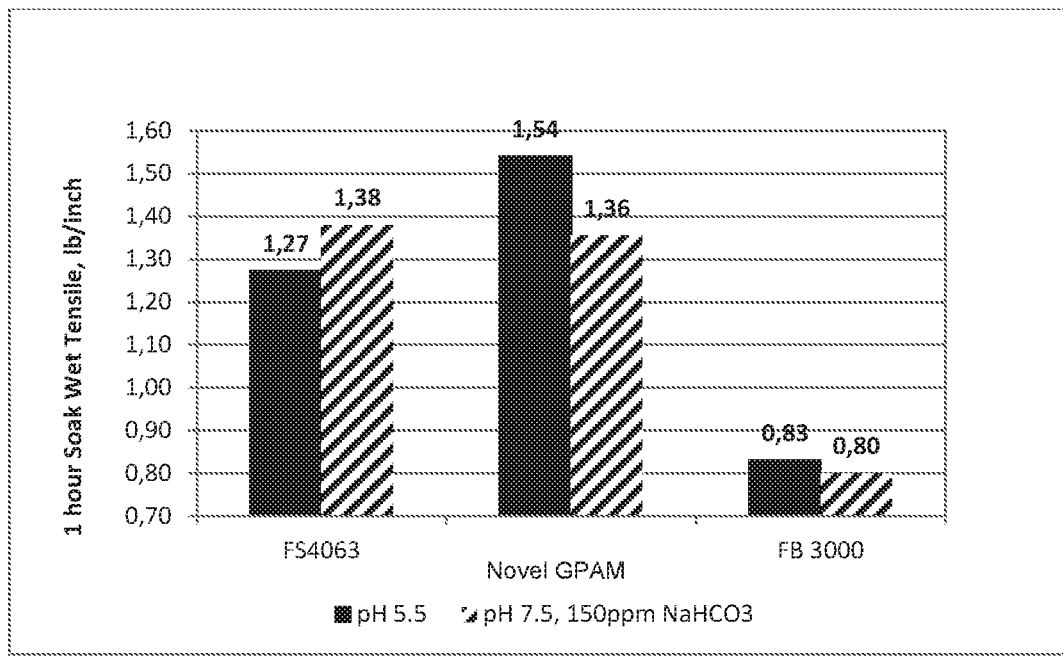
FIG. 5 is a diagram comparing the wet tensile strength obtained by the aqueous composition of glyoxal cross-linked, ferrous sulfate cleaved cationic acrylamide copolymer (Novel GPAM) of the present disclosure, to those obtained by conventional PAE wet strength resin (FS4063) and conventional GPAM (FB3000) (under two pH Levels, dosage=3 lb/t; sheet B.W.=110 lb/3300 ft$^2$).

When the papermaking condition was changed to alkaline, the wet strength performance of the novel GPAM dropped a little as compared to the acidic papermaking condition. However, the novel GPAM was still capable of delivering about equal wet strength efficiency to conventional PAE wet strength resin (FS 4063), shown in FIG. 5. The novel GPAM yielded much higher permanent wet strength performance relative to the conventional GPAM (FB 3000) under both typical papermaking conditions.

Example 4

The aqueous composition of the glyoxal cross-linked, ferrous sulfate cleaved cationic acrylamide copolymer ("novel GPAM") according to the present disclosure was tested as wet strength agent in lightweight paper, using conventional GPAM (FB 3000) and conventional PAE wet strength resin (FS 4063) at the product dosage level of 2.7 kg/ton (about 6lb/ton) as comparisons. Handsheets of a basis weight of 18 kg/307 m$^2$ (about 40 lb/3300 ft$^2$) were made and tested by standard handsheet methods. 130 ppm of $NaHCO_3$ was added to create a natural wet end condition at pH 7.6. The results are shown in FIGS. 6 and 7.

Figure 6:
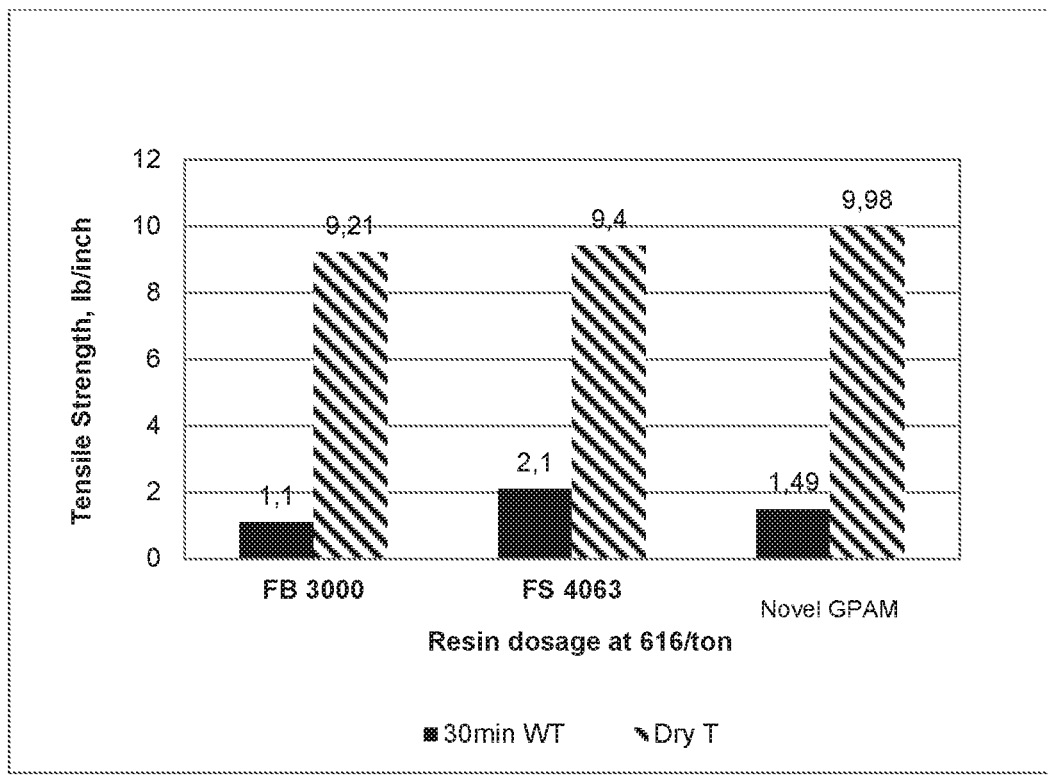
FIG. 6 is a diagram, which compares the dry tensile strengths obtained by the aqueous composition of glyoxal cross-linked, ferrous sulfate cleaved cationic acrylamide copolymer (Novel GPAM) of the present disclosure to those obtained by conventional PAE wet strength resin (FS4063) and conventional GPAM (FB3000) (handsheet performance under natural wet-end conditions at pH 7.6 and 130 ppm NaHCO$_3$).

FIG. 6 shows that the novel GPAM according to the present disclosure (The invention) yielded a much higher wet strength and dry strength relative to conventional GPAM (FB 3000). Moreover, the dry strength relative to conventional PAE wet strength resin (FS 4063) was increased.

Figure 7:
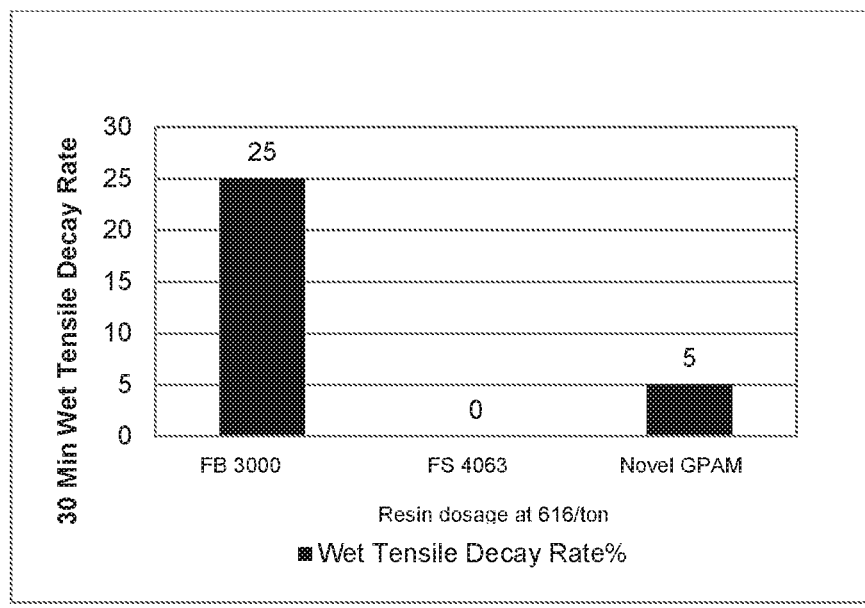
FIG. 7 is a diagram, which compares the wet tensile strength decay rates (30 min soak) achieved with the aqueous composition of glyoxal cross-linked, ferrous sulfate cleaved cationic acrylamide copolymer (Novel GPAM) of the present disclosure to those achieved with conventional GPAM (FB3000) and conventional PAE wet strength resin (FS4063).

FIG. 7 shows that the hydrolysis of the novel GPAM crosslinked cellulose networks was significantly reduced, as can be seen from the decreased 30 minute soak wet strength decay rates, indicating suitability of the novel GPAM as permanent wet strength agent, and e.g. as a replacement of PAE resins.

Example 5

The novel aqueous composition of the glyoxal cross-linked, ferrous sulfate cleaved cationic acrylamide copolymer ("novel GPAM") achieved exceptional drainage improvement as compared to conventional GPAM (FB3000) and conventional PAE at an equal dosage level. The novel GPAM was tested as a drainage aid in a very slowly draining mixed office waste (MOW) recycled stock under alkaline papermaking conditions, using conventional GPAM and PAE at the product dosage level of 6 lb/ton as comparisons. The MOW recycled stock with 0.6% consistency had the very low stock freeness of 248 CSF and very high stock conductivity level of 2800 μs/cm. The pH of the pulp furnish was adjusted to 7.5 with $NaHCO_3$ and other salts. A dynamic drainage analyzer (DDA) was used throughout the test. Dewatering time and air permeability were determined using the DDA unit. The outside pressure was adjusted to 200 mbar in the experiment. A grammage of 375 g/m$^2$ was used. The combination of the lowest drainage time and lowest air permeability is the best drainage program. Detailed drainage times and air permeability values are shown in Table 2.

TABLE 2

Vacuum Drainage Performance

| Run No. | Strength Aid | Strength Aid Added rate lb/ton | Stock Drainage Time (Second) | Pad air permeability (Bar) |
|---|---|---|---|---|
| 1 | Blank without strength aids | 0 | 29.4 | 297.32 |
| 2 | Conventional PAE | 6 | 30.1 | 296.51 |
| 3 | Conventional GPAM | 6 | 29.0 | 289.01 |
| 4 | Novel GPAM | 6 | 20.5 | 260.21 |

From Table 2, it can be seen that there is no significant performance difference between the blank and PAE resin. The conventional GPAM showed a modest drainage improvement over the blank and the conventional PAE. The novel GPAM according to the invention achieved exceptional drainage improvement as compared to the conventional GPAM and PAE at an equal dosage level.

Example 6

The aim of this example was to characterize glyoxylated polyacrylamide (GPAM) samples according to the invention in terms of molecular weight distribution (MWD) and moments (Mn, Mw, Mz) and intrinsic viscosity (IV) by using Gel Permeation Chromatography (GPC).
Experimental Conditions:
  GPC system: Viscotek TDA 305, GPCmax VE 2001
  Detectors: UV, refractive index (RI), dual angle light scattering (90° and 7°), and differential viscometer
  Columns: Viscotek A7Guard 50×8.0 mm, PSS Novema Max ultrahigh, PSS Novema Max 100A
  Eluent: 0.6 M $CH_3COOH$+0.1 M $NaNO_3$
  Flow rate: 0.7 mL/min
  Temperature: 30° C.
  Injection Volume: 100 µL
  Theoretical background, some polymer characteristics computed in GPC context:
  1. Concentration, C, from refractive index detector (RI) data, according to:

$$C = \frac{RI * CF}{dn/dc}, \quad (1)$$

where CF is a constant of the detector, RI is the signal measured and dn/dc is the refractive index increment of the polymer in the $NaNO_3$ solvent used 2. Molecular weight distribution (MWD) and moments of the distribution, Mn, Mw, Mz. Molecular weight, M, of a polymer in solution is computed from light scattering (LS) and RI data using the Rayleigh equation describes the relation of the scattered light of the dissolved polymer molecules by the so-called Raleigh ratio Re, of the polymer concentration and the molecular weight:

$$\frac{Kc}{R_\theta} = \frac{1}{MP(\theta)} + 2A_2c, \quad (2)$$

where K is an optical constant, $A_2$ the second virial coefficient and $P(\theta)$ the structure factor. Next, the moments of distribution Mn, Mw, Mz are computed, using their defining equations.

4. Intrinsic viscosity, [η], computed based on viscosity and RI data; the viscometer provides a signal proportional with the specific viscosity of the sample, $\eta_{sp}$, which together with the concentration from RI, allow [η] calculation:

$$[\eta] = \frac{\eta_{sp}}{c}. \quad (3)$$

Samples and the results of the GPC experiments made in 0.1 M $NaNO_3$ are presented in Table 3. A dn/dc value of 0.18 was used in computing MWD for all the samples.

TABLE 3

Results from GPC experiments made in 0.1M $NaNO_3$: moments of molecular weight distribution (MWD): $M_n$, $M_w$, $M_z$ and intrinsic viscosity (IV).

| Sample | $M_n$ (g/mole) | $M_w$ (g/mole) | $M_z$ (g/mole) | $M_w$/$M_n$ | IV (dl/g) |
|---|---|---|---|---|---|
| Novel GPAM1, 2 w-% solids (dry 20 mol-% cationic HMW PAM as backbone) | 3.942 × 10⁵ | 1.319 × 10⁶ | 2.589 × 10⁶ | 3.346 | 1.569 |
| Novel GPAM2, 2 w % solids (dry 10 mol-% cationic HMW PAM as backbone) | 5.552 × 10⁵ | 1.177 × 10⁶ | 2.357 × 10⁵ | 2.120 | 1.817 |
| Conventional low molecular weight GPAM, 7.5 w % solids (FB3000) | 1.187 × 10⁶ | 4.372 × 10⁶ | 1.299 × 10⁷ | 3.685 | 0.350 |

The invention claimed is:
1. A method for manufacturing an aqueous composition of a structurally modified water-soluble polymer for use in papermaking, comprising:
  (i) providing an acrylamide polymer having a standard viscosity of at least 1 cP, measured at 0.1 weight-% polymer concentration in 1 M NaCl, at 25° C. and pH 8.0-8.5, using a Brookfield DVII T viscometer, in an aqueous medium;
  (ii) incorporating in said aqueous medium a degradation agent capable of reducing the standard viscosity of the acrylamide polymer in the aqueous environment, such that a backbone of the acrylamide polymer is cleaved by the degradation agent; and
  (iii) cross-linking the acrylamide polymer subjected to the cleaving by the degradation agent by introducing a polyfunctional cross-linking agent to said aqueous medium for obtaining the aqueous composition of structurally modified water-soluble polymer.
2. The method according to claim 1, wherein the acrylamide polymer has a standard viscosity of 1.2 cP, measured at 0.1 weight-% polymer concentration in 1 M NaCl, at 25° C., pH 8.0-8.5, using the Brookfield DVII T viscometer.
3. The method according to claim 1, wherein the acrylamide polymer and the degradation agent are dissolved in the aqueous medium simultaneously as a dry mixture.

4. The method according to claim 1, wherein step (iii) is initiated after all degradation agent has been incorporated to the aqueous medium in step (ii).

5. The method according to claim 1, wherein at least step (iii) is conducted on site of the use of the aqueous composition of the structurally modified water-soluble polymer.

6. The method according to claim 1, wherein the degradation agent is an oxidizing degradation agent, a reducing degradation agent, or any combinations thereof.

7. The method according to claim 6, wherein the degradation agent is an oxidizing degradation agent selected from the group consisting of sodium percarbonate, sodium hypochlorite, sodium persulfate, potassium persulfate, ammonium persulfate, hydrogen peroxide, sodium perborate, or any combinations thereof, or a reducing degradation agent selected from the group consisting of an iron compound, tin(II) chloride, sodium borohydride (NaBH$_4$), sodium dithionite, or any combinations thereof.

8. The method according to claim 1, wherein the amount of the degradation agent is from 0.5 to 15 weight-% of the acrylamide polymer, calculated as dry.

9. The method according to claim 1, wherein the polyfunctional cross-linking agent is glyoxal.

10. The method according to claim 1, wherein the amount of the polyfunctional cross-linking agent is from 5 to 80 weight-% of the acrylamide polymer, calculated as dry.

11. The method according to claim 1, wherein the acrylamide polymer is copolymer originating from at least 50 mol-% of acrylamide monomers.

12. The method according to claim 1, wherein the acrylamide polymer is a copolymer of acrylamide and cationic monomers, wherein cationic monomers are selected from the group consisting of 2-(dimethylamino)ethyl acrylate (ADAM), [2-(acryloyloxy)ethyl] trimethylammonium chloride (ADAM-Cl), 2-dimethylaminoethyl methacrylate (MADAM), [2-(methacryloyloxy)ethyl] trimethylammonium chloride (MADAM-Cl), [3-(acryloylamino)propyl] trimethylammonium chloride (APTAC), [3-(methacryloylamino)propyl] trimethylammonium chloride (MAPTAC), and diallyldimethylammonium chloride (DADMAC).

13. The method according to claim 12, wherein the acrylamide polymer is a copolymer originating from at most 30 mol-% of cationic monomers.

14. The method according to claim 1, further comprising buffering the aqueous medium before introducing the polyfunctional cross-linking agent thereto.

15. The method according to claim 14, further comprising adjusting the pH of the aqueous medium to a value of at least 7.0.

16. The method according to claim 1, wherein the aqueous composition has a bulk viscosity of at most 50 cP, measured at 25° C. using the Brookfield DVII T viscometer.

17. The method according to claim 1, wherein the acrylamide polymer has a standard viscosity of 2.0 cP, measured at 0.1 weight-% polymer concentration in 1 M NaCl, at 25° C., pH 8.0-8.5, using the Brookfield DVII T viscometer.

18. A dry intermediate product suitable for use in the method according to claim 1, wherein the intermediate product comprises a mixture of a dry acrylamide polymer having a standard viscosity of at least 1 cP, measured at 0.1 weight-% polymer concentration in 1 M of NaCl, at 25° C., pH 8.0-8.5, using a Brookfield DVII T viscometer, and a dry degradation agent capable of reducing the viscosity of the acrylamide polymer in an aqueous environment by cleaving the backbone of the acrylamide polymer.

* * * * *